United States Patent [19]

Hasegawa et al.

[11] Patent Number: 4,928,134

[45] Date of Patent: May 22, 1990

[54] PLATEN FOR THERMAL TRANSFER PRINTER

[75] Inventors: Tai Hasegawa; Jun Monnai; Masatoshi Matsuzaki, all of Kobe, Japan

[73] Assignee: Konishiroku Photo Industry Co., Ltd., Tokyo, Japan

[21] Appl. No.: 320,515

[22] Filed: Mar. 8, 1989

Related U.S. Application Data

[63] Continuation of Ser. No. 76,481, Jul. 22, 1987, Pat. No. 4,816,842.

[30] Foreign Application Priority Data

Jul. 29, 1986 [JP] Japan ................................ 61-178169
Jul. 29, 1986 [JP] Japan ................................ 61-116477

[51] Int. Cl.[5] ............................................ G01D 15/00

[52] U.S. Cl. ................................ 346/76 PH; 346/155

[58] Field of Search ................ 346/76 PH, 76 R, 134, 346/155; 400/120, 661.1, 657, 662, 659; 219/216.4

[56] References Cited

U.S. PATENT DOCUMENTS

| | | | |
|---|---|---|---|
| 2,203,752 | 6/1940 | Smith | 400/661.1 |
| 4,500,892 | 2/1985 | Hirano | 346/76 PH |

*Primary Examiner*—Arthur G. Evans
*Attorney, Agent, or Firm*—Finnegan, Henderson, Farabow, Garrett and Dunner

[57] ABSTRACT

A platen for a thermal transfer printer includes a support and a platen body mounted on the support and made of an elastic material. The platen body has a first layer located on a thermal printer head side and having a high hardness and a second layer having a hardness lower than that of the first layer. The hardness of the first layer is a JIS A hardness of 60 to 100. The front layer is treated such that a surface roughness of the first layer is not more than 30 μm and a friction coefficient of a surface thereof is small.

17 Claims, 3 Drawing Sheets

PLATEN FOR THERMAL TRANSFER PRINTER

This is a continuation of application Ser. No. 076,481, filed July 22, 1987, now U.S. Pat. No. 4,816,842.

BACKGROUND OF THE INVENTION

1. Field of the Invention

The present invention relates to a platen for a thermal transfer printer.

2. Description of the Prior Art

A conventional platen of this type comprises a support, and a platen body made of an elastic material mounted on the support and having a low hardness (e.g., 20 to 50 as defined in a JIS A hardness test), as described in U.S. Pat. No. 4,134,496.

The hardness of the platen body made of an elastic material is low due to the following reason. In a thermal transfer printer, tight contact between a thermal printing head and the platen body throughout the entire printing area in the widthwise direction is a necessary condition. If an elastic material having a high hardness is used, high precision for mounting the platen body in a printer housing must be assured. However, it is difficult to obtain such high mounting precision in practice The hardness of the platen body is decreased to absorb mounting errors by utilizing elasticity of the platen body More specifically, when the thermal printing head strikes the platen body, the platen body is flexed and assures tight contact with the thermal head surface. In other words, the thermal printing head can be brought into tight contact with a printing sheet through an ink ribbon so as to prevent printing errors such as transfer blinding and transfer omissions.

The conventional platen described above has the following disadvantage. Since the hardness of the platen body made of an elastic material is low, strong contact of the thermal head with the platen body does not increase a reaction force (i.e., a resistance of the platen body). In this state, tight contact between the thermal printing head and the platen body cannot be obtained. In a conventional printer having a conventional platen, only printing sheets having a Bekk smoothness of 100 sec or more can be used. Therefore, it is difficult to print information on rough surface paper with microindentations on its surface.

SUMMARY OF THE INVENTION

The present invention has been made to solve the conventional disadvantage, and has as its object to provide a platen capable of allowing printing on antique paper having microindentations on its surface and of not causing printing errors such as transfer blinding and transfer omissions.

DETAILED DESCRIPTION OF THE PREFERRED EMBODIMENTS

The present invention will be described in detail with reference to preferred embodiments in conjunction with the accompanying drawings Throughout the specification, the front side corresponds to the left side in FIG. 1, the rear side corresponds to the right side, the left side corresponds to the rear surface of FIG. 1, and the right side corresponds to the front surface of FIG. 1.

Figure 1:
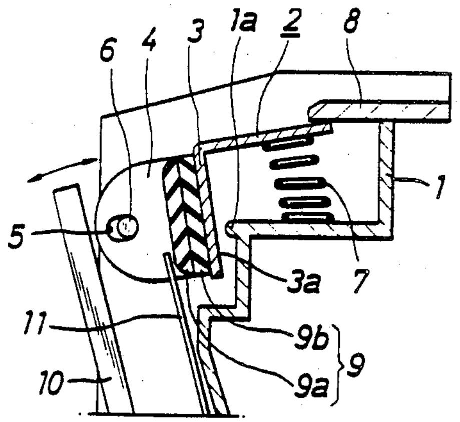
FIG. 1 is a longitudinal sectional view showing the main part of a platen in a nonprinting mode according to a first embodiment of the present invention.
Figure 2:
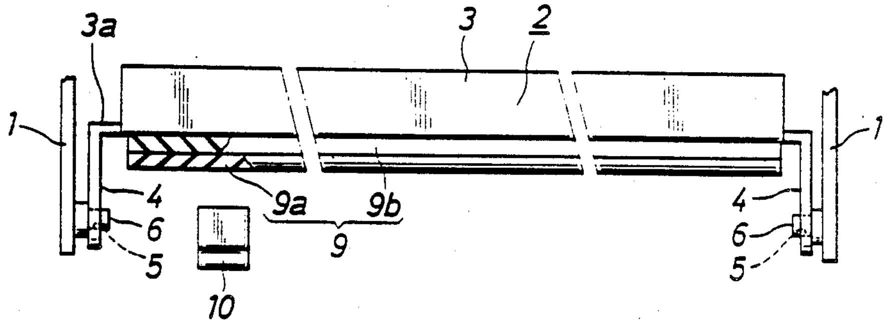
FIG. 2 is a plan view showing the platen of FIG. 1, omitting the intermediate portion thereof.
Figure 3:
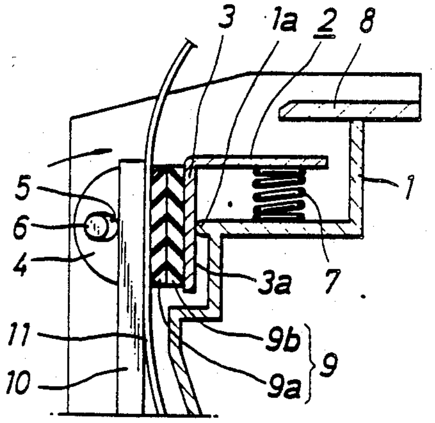
FIG. 3 is a longitudinal sectional view showing the platen of FIG. 1 in a printing mode.

FIGS. 1 to 3 show an embodiment of a platen according to the present invention.

A platen 2 is vertically swingably mounted in a printer housing 1 as follows. A bracket 4 extending forward is mounted on each end of an elongated support 3 having an inverted L-shaped cross section. The support 3 extends along the right-and-left direction. A shaft 6 of the printer housing 1 is loosely received in a through hole 5 formed in the bracket 4 so that the shaft 6 can move a little frontwards and rearwards. The printer housing 1 is horizontally provided with an elongated projection 1*a* of semi-circular shape so as to oppose to the substantially central portion of the back of a housing mounting wall 3*a* of the support 3.

The platen 2 is biased by a spring 7 such that the front surface of a platen body 9 (to be described in detail later) faces downward. The platen 2 is designed to abut against a stopper 8 formed on the printer housing 1 so as to prevent excessive rotation of the platen over a preset position. With the above structure, when a thermal printing head 10 (to be described in detail later) is brought into contact with the platen 2, the platen 2 receives a force from the thermal printing head 10 and is rotated clockwise (FIG. 1) against the biasing force of the spring 7. Therefore, the platen 2 is moved to a position where it can be brought into optimal tight contact with the thermal printing head 10 and the back of the support 3 can contact with the projection 1*a* of the housing 1.

The platen body 9 is mounted on the housing mounting wall 3*a* of the support 3. The platen body 9 is made of an elastic material such as rubber, and its lower edge is arcuated. The arcuated surface of the platen body 9 has a function of smoothly guiding an upwardly fed printing sheet 11 to a position in front of the platen body 9. The platen body 9 comprises a front layer 9*a* having a high hardness (e.g., a hardness of about 60 to 100 as defined in a JIS A hardness test) and a rear layer 9*b* having a lower hardness than that of the front layer 9*a*. The rear layer 9*b* is formed such that the same material as that of the front layer 9*a* is formed to decrease the hardness. However, different materials may be used to form the front and rear layers 9*a* and 9*b* to differentiate the hardness of the front layer 9*a* from that of the rear layer 9*b*. For example, a material for the front layer 9*a* may be urethane rubber, chloroprene rubber, SBR rubber, EPDM, EPM rubber, or the like having a JIS A hardness of 70 to 80, a modulus of elasticity of 30 to 80% and a thickness of 0.5 to 7 mm. A material for the rear layer 9*b* may be a chloroprene rubber foam or a urethane foam having a JIS A hardness of 20 to 60 and a thickness of 0.2 to 5 mm (consisting of the same material as that of the front layer 9*a* but having a lower hardness). The present inventors used 2-mm thick urethane rubber (ester-based rubber BANCORAN #732-49 (tradename) available from Bando Chemical K.K.) having a hardness of 70 and a modulus of elasticity of 55% to form the front layer 9a and a 0.8-mm thick polyurethane foam (Scotch #4032 tradename) available from Minnesota Mining & Manufacturing Co.) having a hardness of 30 to 40 to form the rear layer 9b, thereby preparing a platen body. The present inventors also used 1.5-mm thick CR rubber having a hardness of 80 and a modulus of elasticity of 65% or 2-mm thick urethane rubber (ester-based rubber Typrene TR100 (tradename) available from Tiger's Polymer K.K.) having a hardness of 70 and a modulus of elasticity of 50% to form the front layer 9a and a 1.2-mm thick chloroprene foam Scotch #4965 (tradename) available from Minnesota Mining & Manufacturing Co. or a 1.0-mm thick urethane foam (Endure C-150 (tradename) available from Inoue MTP K.K.) having a hardness of 35 to prepare the rear layer 9b, thereby preparing a platen body.

Figure 4:
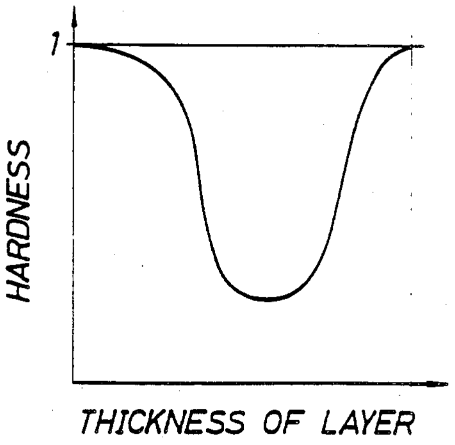
FIG. 4 is a graph for explaining a platen hardness as a function of thickness of the platen.

The platen body 9 used in this embodiment comprises the front and rear layers 9a and 9b one of which may comprise a structure having more than two layers. Part of the rear layer 9b may have a hardness higher than that of the front layer 9a. Only the central portion of a single material may be foamed, and a portion behind the formed portion may serve as the rear layer 9b, thus obtaining a hardness distribution of the platen body 9, as shown in FIG. 4. A surface roughness of the front layer 9a is preferably 30 μm or less and its surface friction coefficient is preferably small. In order to decrease the friction coefficient, a hydrofluoric resin tape is adhered to the surface of the platen 9 or the surface may be matted or halogenized.

The thermal printing head 10 having a known heating resistor is arranged in front of the platen body 9 and is movable along the right-and-left direction and is swingable back and forth.

As is well known, an ink ribbon (not shown) passes between the thermal printing head 10 and the platen body 9.

The present invention is not limited to a flat platen shown in the above embodiment, but can be extended to a roller type round platen.

In the above embodiment, the platen body has the front layer of a high hardness on the thermal printing head side. Even if the thermal printing head is strongly urged against the platen body, the platen body is not excessively flexed. Therefore, the thermal printing head can be brought into tight contact with the platen body. As a result, the ink surface of the ink ribbon is strongly urged against the printing sheet, and printing can be performed on antique paper having a Bekk smoothness of 20 to 30 sec. In addition, the hardness of the rear layer is lower than that of the front layer. By utilizing elasticity of the rear layer, the thermal printing head can be appropriately brought into tight contact with the printing sheet through the ink ribbon to prevent printing errors such as transfer blinding and transfer omissions.

Another embodiment of a printer according to the present invention will be described with reference to FIGS. 5 to 7. The same reference numerals as in FIGS. 1 to 3 denote the same parts in FIGS. 5 to 7.

Figure 5:
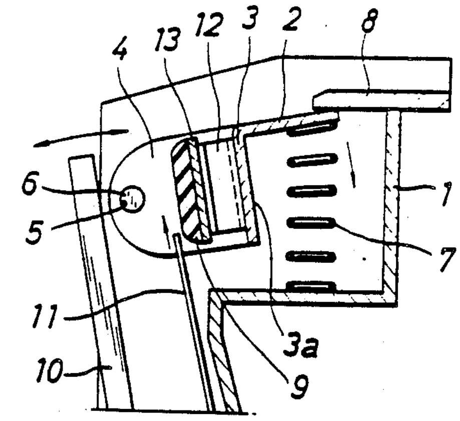
FIG. 5 is a longitudinal sectional view showing the main part of a platen in the nonprinting mode according to a second embodiment of the present invention.
Figure 6:
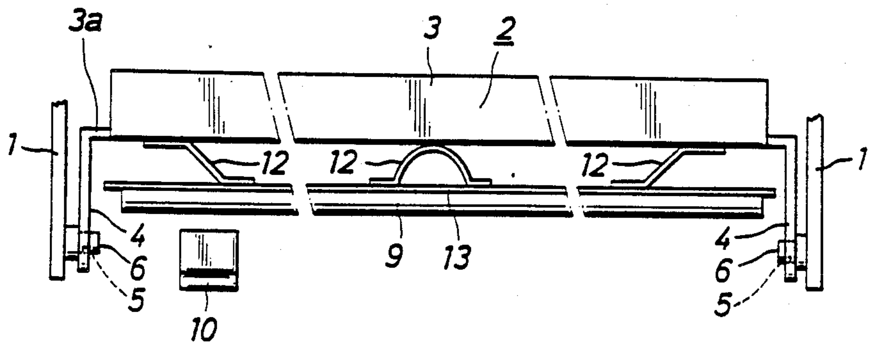
FIG. 6 is a plan view of the platen of FIG. 5, omitting the intermediate portion thereof.
Figure 7:
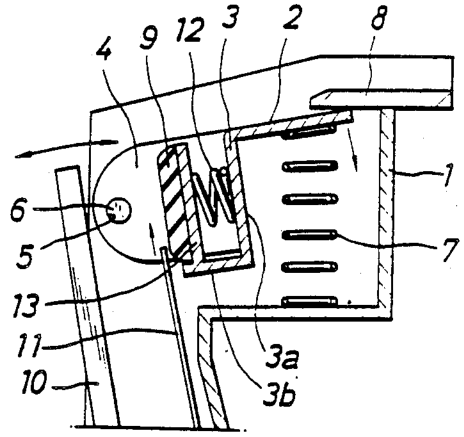
FIG. 7 is a longitudinal sectional view showing a modification of the platen of the second embodiment shown in FIG. 5.

In the embodiment of FIGS. 5 to 7, a platen body 9 made of an elastic material is mounted on a reinforcing plate 13, and the reinforcing plate is mounted on a housing mounting wall 3a of a support 3 through an elastic member 12 such as a coil spring. The lower edge of the platen body 9 has an arcuated surface to smoothly guide an upwardly fed printing sheet 11 to a position in front of the platen body 9. The platen body 9 comprises an elastic material such as urethane rubber or CR rubber having a high hardness (a JIS A hardness of about 60 to 100). The platen body 9 is preferably treated such that the surface roughness of the platen body 9 is 30 μm or less and the surface friction coefficient thereof is small. As a method of decreasing a friction coefficient, a hydrofluoric resin tape may be adhered to the surface of the platen body 9, or the surface may be matted or halogenized.

If a coil spring is used as the elastic member 12, a horizontal support wall 3b for supporting the platen body 9 is preferably formed on the support 3, as shown in FIG. 7.

The elastic member 12 which can be used in this embodiment includes a sponge, a foamed member, or an air cushion in addition to a leaf spring and a coil spring.

In this embodiment, the hardness of the platen body is high. Even if the thermal printing head is strongly brought into contact with the platen body, the platen body is not excessively flexed. Therefore, tight contact between the thermal printing head and the platen body can be obtained. As a result, the ink surface of the ink ribbon is strongly urged against the printing sheet, and printing can be performed on antique paper having microindentations on its surface. Furthermore, the platen body is mounted on the support through the elastic member. By utilizing elasticity, the thermal printing head is appropriately brought into tight contact with the printing sheet through the ink ribbon without requiring improvement in mounting precision of the platen in the printing housing. Therefore, printing errors such as transfer blinding and transfer omissions can be prevented.

What is claimed is:

1. A platen for a thermal transfer printer, including a support and a platen body mounted on said support and made of an elastic material, characterized in that said platen body comprises a first layer having a high hardness located on the side of a thermal printer head and a second layer having a lower hardness than that of said first layer, said second layer being located on the side of said support.

2. A platen according to claim 1, wherein the hardness located on the side of said support of said first is a JIS A hardness of 60 to 100.

3. A platen according to claim 1, wherein said first layer is treated in such manner that a surface roughness of said first layer is not more than 30 μm and a friction coefficient of a surface thereof is small.

4. A platen according to claim 1, wherein said second layer consists of a foamed elastic material.

5. A platen according to claim 1, wherein the hardness of said first and/or second layer is changed in a direction of thickness.

6. A platen according to claim 1, wherein said first and/or second layer consists of a multilayered elastic material.

7. A platen according to claim 1, wherein said first and second layers are integrally formed.

8. A platen according to claim 1, wherein said platen comprises a platen of a narrow plate.

9. A platen according to claim 8, wherein said support is swingable about a printer housing.

10. A platen according to claim 8, wherein said support is biased downward by an elastic member.

11. A platen according to claim 8, wherein said first layer has an arcuated surface.

12. A platen according to claim 1, wherein said platen is of a roller type.

13. A platen according to claim 1, wherein said first layer of said platen body is made of urethane rubber and said second layer is made of urethane foam.

14. A platen for a thermal transfer printer comprising:

a platen body made of an elastic material having a high hardness;

a support for supporting said platen body;

a reinforcing plate provided on said support for mounting said platen body; and an elastic member for resiliently affixing said reinforcing plate to said support.

15. A platen according to claim 14, wherein the elastic material has a JISA hardness in the range of 60 to 100.

16. A platen according to claim 14, wherein said elastic member includes a leaf spring.

17. A platen according to claim 14, wherein said elastic member includes a coil spring.

* * * * *